United States Patent
Sun

(10) Patent No.: US 10,386,247 B2
(45) Date of Patent: Aug. 20, 2019

(54) EXTENDING A RANGE OF AN OPTICAL FIBER DISTRIBUTED SENSING SYSTEM

(71) Applicant: OFS Fitel, LLC, Norcross, GA (US)

(72) Inventor: Xiaoguang Sun, West Hartford, CT (US)

(73) Assignee: OFS FITEL, LLC, Norcross, GA (US)

( * ) Notice: Subject to any disclaimer, the term of this patent is extended or adjusted under 35 U.S.C. 154(b) by 189 days.

(21) Appl. No.: 15/460,286

(22) Filed: Mar. 16, 2017

(65) Prior Publication Data

US 2018/0087976 A1 Mar. 29, 2018

Related U.S. Application Data

(60) Provisional application No. 62/401,405, filed on Sep. 29, 2016.

(51) Int. Cl.
*G01K 11/32* (2006.01)
*G02B 6/26* (2006.01)
*G02B 6/293* (2006.01)

(52) U.S. Cl.
CPC ........ *G01K 11/32* (2013.01); *G01K 2011/324* (2013.01); *G02B 6/264* (2013.01); *G02B 6/2938* (2013.01)

(58) Field of Classification Search
CPC . G01N 2021/3595; A23L 3/3445; A23L 5/13; G01J 2005/0077; G01J 2005/0081; G01J 5/0003; G01J 5/0037; G01J 5/025; G01J 5/10; G01K 11/32
USPC .................. 374/120, 130, 137, 110, 112, 161
See application file for complete search history.

(56) References Cited

U.S. PATENT DOCUMENTS

| | | | | |
|---|---|---|---|---|
| 5,673,280 A * | 9/1997 | Grubb | ..................... | H01S 3/302 372/3 |
| 6,031,646 A * | 2/2000 | Sniadower | ........ | H01S 3/094003 359/341.33 |
| 7,050,672 B1 | 5/2006 | Matsumoto et al. | | |
| 7,170,590 B2 * | 1/2007 | Kishida | .................. | G01B 11/16 250/227.14 |
| 7,304,725 B2 * | 12/2007 | Hartog | ............... | G01M 11/3109 356/73.1 |
| 7,881,566 B2 * | 2/2011 | Lees | ....................... | G01K 11/32 356/51 |
| 8,641,274 B2 | 2/2014 | Omichi et al. | | |
| 8,693,512 B2 * | 4/2014 | Lecoeuche | ........... | H04B 10/572 356/300 |
| 9,645,018 B2 * | 5/2017 | Lee | ....................... | G01K 15/005 |
| 10,036,672 B2 * | 7/2018 | Iwamura | ................. | G01K 11/32 |
| 2001/0033412 A1 * | 10/2001 | Vavassori | ........... | H01S 3/06758 359/341.3 |

(Continued)

FOREIGN PATENT DOCUMENTS

| | | | | |
|---|---|---|---|---|
| CN | 104111127 A | * | 10/2014 | |
| JP | H0654827 B2 | * | 7/1994 | ............... H01S 3/30 |

*Primary Examiner* — Gail Kaplan Verbitsky
(74) *Attorney, Agent, or Firm* — David E. Rodrigues; Cantor Colburn, LLP

(57) ABSTRACT

Embodiments are directed to a distributed temperature sensing system. The system includes a first fiber optic cable and a second fiber optic cable. A first coupler is coupled to the first fiber optic cable. A second coupler is coupled to the second fiber optic cable. An optical isolator coupled between the first coupler and the second coupler to remove a Stokes signal in order to increase the range of the distributed temperature sensing system.

16 Claims, 3 Drawing Sheets

(56) References Cited

U.S. PATENT DOCUMENTS

| | | | |
|---|---|---|---|
| 2002/0012142 A1* | 1/2002 | Gautheron | H04B 10/0731 398/79 |
| 2002/0191915 A1 | 12/2002 | Anjan | |
| 2005/0185685 A1* | 8/2005 | Chapman | G11C 5/147 372/32 |
| 2005/0259325 A1* | 11/2005 | Ghidini | G02F 1/093 359/485.01 |
| 2007/0229816 A1* | 10/2007 | Chen | G01K 11/32 356/301 |
| 2007/0297462 A1* | 12/2007 | Jalali | H01S 3/083 372/3 |
| 2012/0310535 A1* | 12/2012 | Takei | G01N 25/62 702/3 |
| 2013/0100984 A1* | 4/2013 | Agawa | G01K 11/32 374/161 |
| 2013/0208762 A1* | 8/2013 | Mitchell | G01K 11/32 374/161 |
| 2014/0233600 A1 | 8/2014 | Lee | |
| 2014/0241396 A1* | 8/2014 | Shida | G01K 11/32 374/161 |
| 2015/0102240 A1* | 4/2015 | Zhu | G01N 21/39 250/565 |
| 2016/0091429 A1* | 3/2016 | Huber | G01J 3/44 356/301 |
| 2016/0168980 A1* | 6/2016 | Bedry | E21B 47/065 374/136 |
| 2016/0258808 A1* | 9/2016 | Cedilnik | G01J 1/0425 |
| 2017/0179672 A1* | 6/2017 | Kashiwagi | H01S 3/091 |
| 2017/0205256 A1* | 7/2017 | Kim | G01D 5/35374 |
| 2018/0094987 A1* | 4/2018 | Iwamura | G01K 11/32 |

\* cited by examiner

EXTENDING A RANGE OF AN OPTICAL FIBER DISTRIBUTED SENSING SYSTEM

CROSS-REFERENCE TO RELATED APPLICATIONS

This application claims priority to U.S. Provisional Patent Application Ser. No. 62/401,405, filed Sep. 29, 2016, which is hereby incorporated by reference in its entirety.

BACKGROUND

The embodiments described herein relate in general to the field of fiber optics. More specifically, the embodiments described herein relate to distributed temperature sensing (DTS) systems.

Optical fibers have been used in communication systems to transmit information. Recently, optical fibers have been used for sensing purposes. Such a technology has a variety of advantages. For example, fiber optic sensors have higher signal bandwidth, are immune to electromagnetic interferences, immune to vibrations, provide safe operation (for example, no electric sparks are present, and thus can be used in a hazardous area), and is easy to install. In addition, fiber optic sensing is distributed, in that measurements can be made throughout the length of a fiber optic cable. In such a manner, measurements can be achieved in the range of 10 kilometers or more. The installation is much simple in that there is no need for multiple wires to transmit data over such great distances. A single fiber optic distributed sensor can be equivalent to thousands of point sensors. Various techniques can be used to increase the range of such a distributed sensor.

SUMMARY

Embodiments are directed to a distributed temperature sensing system. The system includes a first fiber optic cable and a second fiber optic cable. A first coupler is coupled to the first fiber optic cable. A second coupler is coupled to the second fiber optic cable. An optical isolator is coupled between the first coupler and the second coupler.

Embodiments are further directed to a system for measuring temperature via distributed temperature sensing. The system includes a first fiber optic cable and a first coupling system coupled to the first fiber optic cable. The system further includes a second fiber optic cable. The first coupling system includes a first coupler coupled to the first fiber optic cable, a second coupler coupled to the second fiber optic cable, and a first optical isolator coupled between the first coupler and the second coupler.

Embodiments are further directed to a method for measuring temperature via distributed temperature sensing. The method comprises transmitting light through a first fiber optic cable. The first fiber optic cable is coupled to a second fiber optic cable. The method further comprises detecting backscattered light. The backscattered light comprises an anti-Stokes band and a Stokes band in the first fiber optic cable. The method further comprises calculating a ratio between an intensity of the anti-Stokes band and an intensity of the Stokes band. The method further comprises using the calculated ratio to determine a temperature being sensed in the first fiber optic cable or the second fiber optic cable. The first fiber optic cable is coupled to the second fiber optic cable via a first coupler coupled to the first fiber optic cable, a second coupler coupled to the second fiber optic cable, and an optical isolator coupled between the first coupler and the second coupler. The optical isolator is configured to remove a Stokes signal traveling from the first fiber optic cable to the second fiber optic cable.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 1 B is a graph illustrating the performance of previous DTS systems;

FIG. 1 C is a graph illustrating the performance of previous DTS systems;

DETAILED DESCRIPTION

Figure 1A:
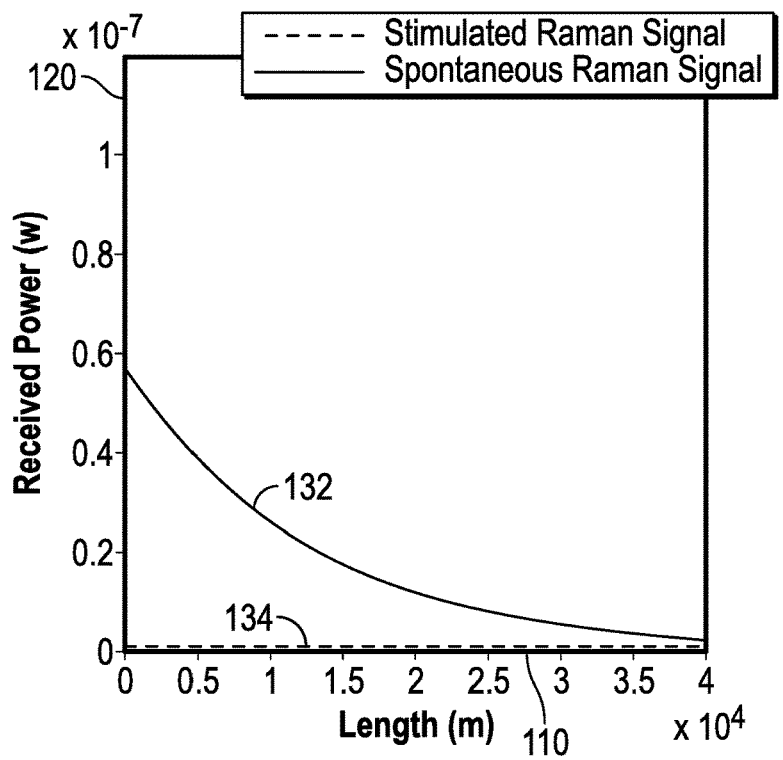
FIG. 1 A is a graph illustrating the performance of previous DTS systems.

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Distributed temperature sensing (DTS) relies on the fact that the physical environment (including temperature and pressure) can effect fibers and locally change the characteristics of light transmission in the fiber. In general, fiber optics work by transmitting light through the fiber. DTS operates by transmitting a pulse of light through the fiber and measuring backscattered light.

Thermal effects on the fiber induce lattice oscillations. When light impinges on these thermally excited molecular oscillations, an interaction occurs between the light particles and the electrons of the molecule. Light scattering thus occurs in the optical fiber. This scattering is called Raman scattering. The scattered light undergoes a spectral shift by an amount equivalent to the resonant frequency of the lattice oscillation. The light scattered back in the fiber has three different wavelengths: Rayleigh scattering with the wavelength of the light source; Stokes band from photons shifted to a lower frequency than the frequency corresponding to the light source; and an anti-Stokes band, with photons shifted to a longer frequency than that of the Rayleigh scattering. In general, the intensity of the anti-Stokes band is temperature dependent, while the Stokes band is not as temperature dependent. The temperature of the optical fiber at a certain point can be determined by finding a ratio of the intensity of the anti-Stokes band to the intensity of the Stokes band.

To obtain the temperature measurement, a variety of techniques have been used. One technique is optical time domain reflectometry (OTDR). In OTDR, a pulsed light source is used and the location of the temperature is identified by a calculation of the pulse's round trip time to the distance under test. Another used technique is optical frequency domain reflectometry (OFDR). In OFDR, a modulated light source is used and the position of a temperature event is calculated by applying an inverse Fourier transform of the fiber's transfer function, or the frequency response.

Figure 1B:
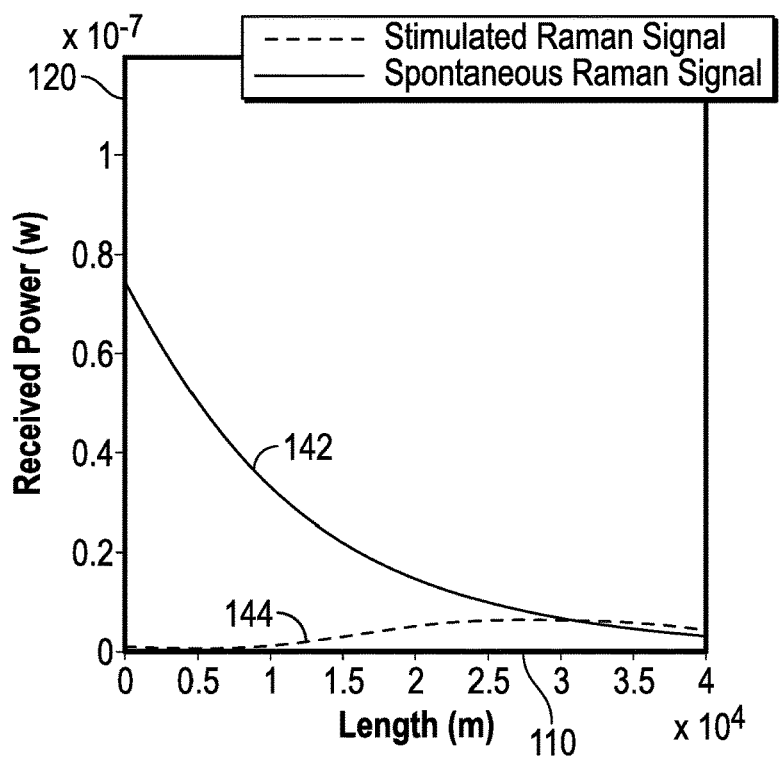
Figure 1C:
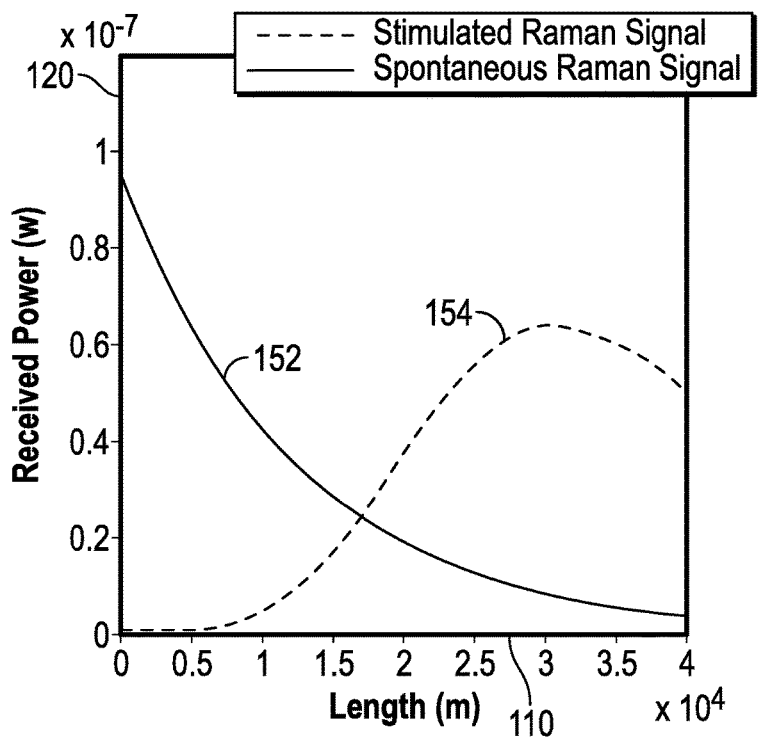

It has been found that there can be a limit to the range of the temperature sensor. With reference to FIGS. 1A through 1C, a series of graphs are shown that illustrate the received power level of a stimulated Raman signal versus that for the spontaneous Raman signal.

Spontaneous Raman scattering occurs when the incoming photons are scattered by a material. Stimulated Raman scattering takes place when some Stokes photons have been previously generated by spontaneous Raman scattering or when Stokes photons are deliberately injected together with the original light. In general, the temperature information is contained in the spontaneous Raman signal. For optimum resolution, it is desirable for the received power level of the stimulated Raman signal to be less than 10% of the spontaneous Raman signal. In some embodiments, it may be desirable for the received power level of the stimulated Raman to be less than 5% of the value of the spontaneous Raman signal. Otherwise, distinguishing the spontaneous Raman signal from the stimulated Raman signal might be difficult. This fact lowers the sensing distance even further.

In FIG. 1A, the spontaneous versus stimulated Raman signals are shown given a 15 watt input signal. The x-axis 110 represents distance from the light source. The y-axis 120 represents the received power of the signal. In FIG. 1A, the spontaneous Raman signal 132 is greater than the stimulated Raman signal 134 for the entire plot. However, the received power level of the spontaneous Raman signal 132 attenuates as a function of distance from the light source.

It may be desirable to increase the power of the input signal in an attempt to increase the distances at which the DTS can operate. However, increasing the power of the input signal may not work because the received power level related to the stimulated Raman signal increases more than the received power level related to the spontaneous Raman signal. In FIG. 1B, the received power level of the spontaneous Raman signal is plotted against the received power level of the stimulated Raman signals, given a 20 watt input signal. The x-axis 110 represents distance from the light source. The y-axis 120 represents the received power of the signal. In FIG. 1B, the received power level of the spontaneous Raman signal 142 is greater than the received power level of the stimulated Raman signal 144 until a distance of approximately 30 kilometers. At that distance, the received power of the stimulated Raman signal actually surpasses the received power level corresponding to the spontaneous Raman signal. Because it is desirable for the power of the stimulated Raman signal to be significantly less than that of the spontaneous Raman signal, the usable distance for temperature measurements is even less than 30 kilometers (the point at which the crossover in received power level occurs).

In FIG. 1C, the received power levels for a spontaneous versus a stimulated Raman signal is shown given a 25 watt input signal. The x-axis 110 represents distance from the light source. The y-axis 120 represents the received power of the signal. In FIG. 1C, the received power level for the spontaneous Raman signal 152 is greater than the received power level for the stimulated Raman signal 154 until a distance of approximately 17 kilometers. From the FIGS. 1A through 1C, it may be therefore seen that increasing the power of the input signal does not work because the received power level related to the stimulated Raman signal increases much more than the received power level related to the spontaneous Raman signal.

In some embodiments, a solution to this issue is to use a filter that removes the Stokes signal to prevent growth of the stimulated Raman signal. The filter can also include an isolator that is configured to allow only a backscattered Stokes signal to travel back to the detector.

Figure 2:
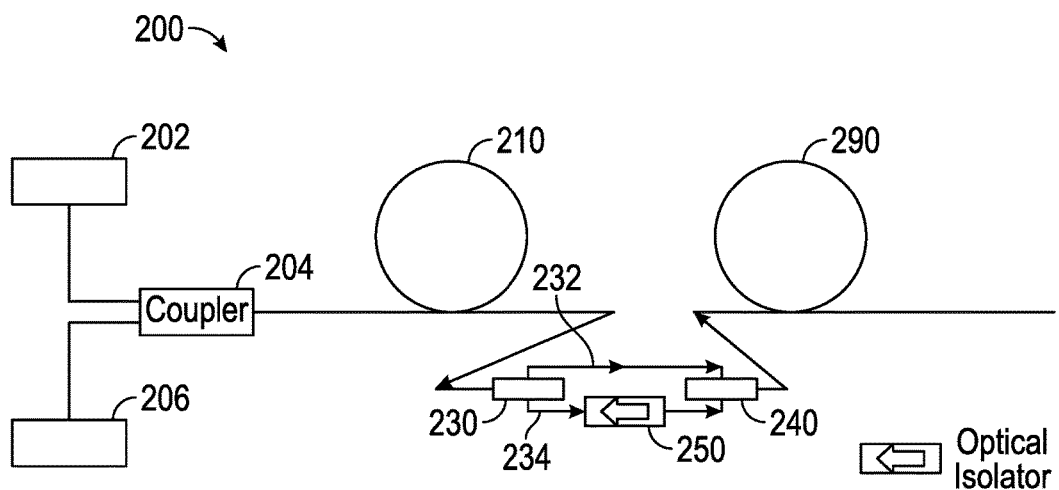
FIG. 2 is a block diagram illustrating an exemplary embodiment.

FIG. 2 is a block diagram that depicts an exemplary system 200 that includes a first sensing fiber optic cable 210 (hereinafter sometimes referred to as the first fiber optic cable 210) and a second sensing fiber optic cable 290 (hereinafter sometimes referred to as the second fiber optic cable 210). The lengths of the first fiber optic cable 210 can be the same of different from the length of the second fiber optic cable. In an embodiment, the length of the second fiber optic cable is typically larger than the length of the first fiber optic cable. In an embodiment, the length of the first fiber optic cable is at least 5 kilometers, while the length of the second fiber optic cable is at least 15 kilometers.

A light from a light source 202 is transmitted through sensing fiber optic cable 210 through coupler 204. The coupler 204 (e.g., a fiber optic coupler) is a device used in optical fiber systems with one or more input fibers and one or several output fibers. Light entering an input fiber can appear at one or more outputs and its power distribution is potentially dependent on the wavelength and polarization. Backscattered light from sensing fiber optic cable 210 is received through the coupler 204 and directed to a photodetector 206. Photodetector 206 converts the light signal into an electrical signal. The electrical signal is processed in a manner described above, where the ratio of various wavelengths of light are calculated to determine the temperature of at various distances from the light source. The processing can take place in any type of computing system (not shown) to which photodetector 206 is coupled. Light through sensing fiber optic cable 210 also travels through sensing fiber optic cable 290, to which the sensing fiber optic cable 210 is coupled.

Between first sensing fiber optic cable 210 and second sensing fiber optic cable 290 are a first wavelength division multiplexer (WDM) 230 coupled to first sensing fiber optic cable 210 and a second wavelength division multiplexer 240 that is coupled to second sensing fiber optic cable 290. Between wavelength division multiplexer 230 and wavelength division multiplexer 240 is an optical isolator 250. The combination of the first wavelength division multiplexer (WDM) 230 and the second wavelength division multiplexer 240 in conjunction with the optical isolator 250 and the optical fiber sections therebetween are sometimes referred to herein as a "WDM/isolator" combination. The WDM/isolator combination disposed between the first sensing fiber optic cable 210 and the second sensing fiber optic cable 290 is called the first WDM/isolator combination.

While not shown in the FIG. 2, the system may further comprise a third sensing fiber optic cable that is in optical communication with the second sensing fiber optic cable via a third coupler and a fourth sensing fiber optic cable that is in optical communication with the third sensing fiber optic cable via a fourth coupler. In an embodiment, a second WDM/isolator combination may be disposed between the second sensing fiber optic cable and the third sensing fiber optic cable. A third WDM/isolator combination may be disposed between the third sensing fiber optic cable and the fourth sensing fiber optic cable and so on to increase the distance over which temperatures can be determined.

In another embodiment, a third coupler is coupled to the second fiber optic cable and a fourth coupler is coupled to the third fiber optic cable. A second optical isolator is coupled between the third coupler and the fourth coupler.

Wavelength division multiplexing is a method of combining or separating multiple wavelengths of light in or out of a single strand of fiber into signals of different wavelengths. The wavelength-division multiplexer (WDM) multiplexes a number of optical carrier signals onto a single optical fiber by using different wavelengths (i.e., colors) of laser light. Multiplexing involves the simultaneous transmission of several signals along a single channel of communication. The optical isolator or optical diode is an optical component, which allows the transmission of light in only one direction. It is used to prevent unwanted feedback the WDM.

In system 200, WDM 230 is configured to separate the light from sensing fiber optic cable 210 into pump signal 232 and the Stokes signal 234. Pump signal 232 is transmitted to WDM 240 from where it is then transmitted to sensing fiber optic cable 220. The Stokes signal 234 is coupled to the optical isolator 250. WDM 230 also serves to re-combine backscattered signals from the sensing optical fiber optic cable 290 that are traveling to sensing fiber optic cable 210 that were split by WDM 240. WDM 240 is similarly configured, separating a backscattered signal traveling from sensing fiber optic cable 290 to sensing fiber optic cable 210 and re-combining signals from sensing fiber optic cable 210 to sensing fiber optic cable 290. As noted above, the combination of the WDMs 230 and 240 with the optical isolator 250 is referred to herein as a "WDM/isolator" combination. In an embodiment, the system may have a plurality of isolators, couplers or WDM/isolator combinations.

Optical isolator 250 is configured to remove the forward traveling Stokes signal, while allowing the backscattered signal (from sensing fiber optic cable 290 to sensing fiber optic cable 210) to pass. Removing the forward traveling Stokes signal greatly increases the range of the DTS because the forward traveling Stokes signal no longer will interfere with the other signals in sensing fiber optic cable 290.

It should be understood that system 200 shown in FIG. 2 may be extended to include multiple WDM/isolator configurations between lengths of fiber. In one exemplary embodiment, it has been found that placing a WDM/isolator configuration at a distance of 6 kilometers from the light source and another WDM/isolator configuration at a distance of 21 kilometers from the light source can result in a significant improvement in performance. In other words, by the range of accurate temperature detection can be increased by including a plurality of WDM/isolator configurations at regular or irregular intervals between the light source 220 and the point at which the temperature is to be determined. In an embodiment, the system 200 can include 1 or more WDM/isolator combinations, preferably 2 or more WDM/isolator combinations, and more preferably 3 or more WDM/isolator combinations.

Figure 3:
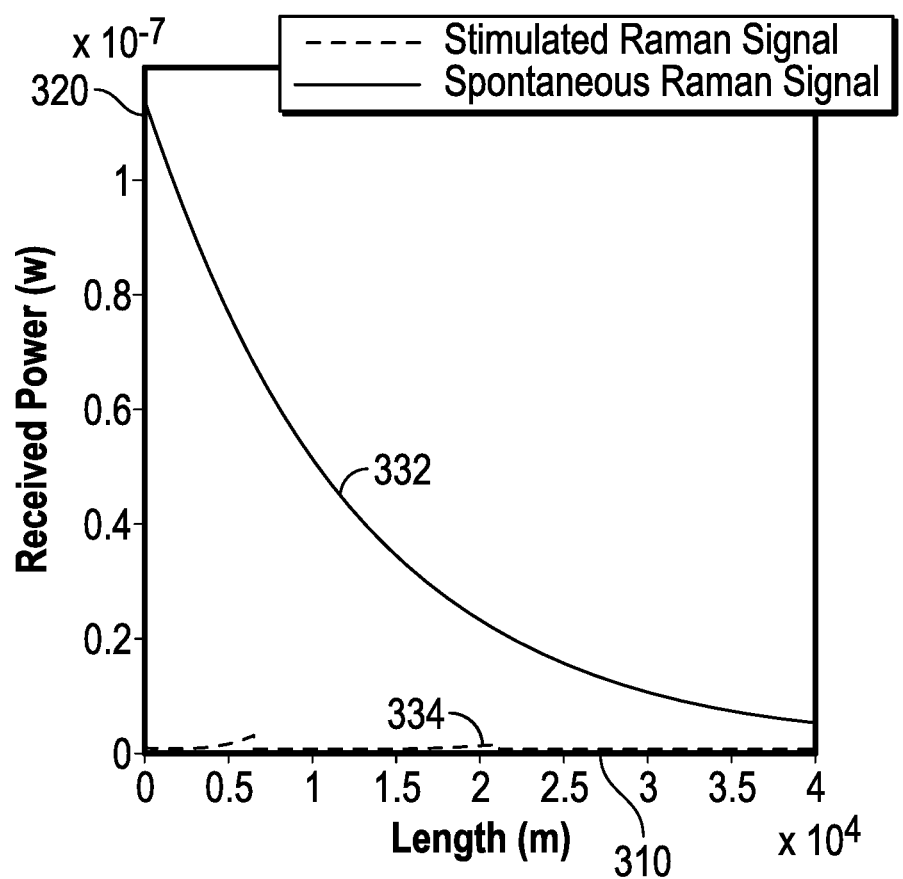
FIG. 3 is a graph illustrating the performance of an embodiment.

With reference to FIG. 3, a graph is shown that is similar to those shown in FIGS. 1A through 1C. The graph plots the stimulated Raman signal versus the spontaneous Raman signal. The x-axis 310 represents distance from the light source. The y-axis 320 represents the received power of the signal.

In the graph of FIG. 1C, it was shown that even an input signal of 25 watts would result in the stimulated Raman signal surpassing the signal level of the spontaneous Raman signal at a distance of approximately 17 kilometers from the light source. In FIG. 3, it can be seen that, even with a much more powerful input signal (40 watts), the level of the stimulated Raman signal 332 is significantly lower than the level of the spontaneous Raman signal 334 for the entire length of the sensing fiber optic cable. The FIG. 3 shows that over a distance of 40 kilometers the WDM/isolator combination prevents the received power level of the stimulated Raman signal from increasing to a value that is greater than that of the received power level of the spontaneous Raman signal. The system disclosed herein is advantageous because using the WDM/isolator combination increases the distance over temperature measurements by an amount of at least 50%, preferably 75%, and more preferably at least 100% over a comparative system that does not contain the WDM/isolator combination for a given amount of power.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for measuring temperature via distributed temperature sensing comprising:
   a first fiber optic cable;
   a second fiber optic cable;
   a first coupler coupled to the first fiber optic cable;
   a second coupler coupled to the second fiber optic cable;
   an optical isolator disposed between the first coupler and the second coupler and in optical communication with the first coupler and the second coupler;
   a light source configured to send a light through the first and second fiber optic cable;
   a photodetector configured to convert received light into electrical signals; and a computing unit configured to calculate a ratio between and anti-Stokes band in the received light and a Stokes band in the received light to determine a temperature along a length of the first or second fiber optic cable.

2. The system of claim 1, wherein the first coupler is a first wavelength division multiplexer.

3. The system of claim 2, wherein the first wavelength division multiplexer is configured to separate a light signal from the first fiber optic cable into a pump signal and a Stokes signal.

4. The system of claim 3, wherein the second coupler is a second wavelength division multiplexer.

5. The system of claim 4, wherein, the optical isolator is configured to filter a Stokes signal traveling from the first fiber optic cable to the second fiber optic cable.

6. The system of claim 5, wherein the optical isolator is further configured to allow a backscattered signal to travel from the second fiber optic cable to the first fiber optic cable.

7. The system of claim 1, further comprising:
a third fiber optic cable;
a third coupler coupled to the second fiber optic cable;
a fourth coupler coupled to the third fiber optic cable; and
a second optical isolator coupled between the third coupler and the fourth coupler.

8. A system for measuring temperature via distributed temperature sensing comprising:
a first fiber optic cable;
a first coupling system coupled to the first fiber optic cable; and
a second fiber optic cable; wherein the first coupling system comprises:
a first coupler coupled to the first fiber optic cable;
a second coupler coupled to the second fiber optic cable;
a first optical isolator coupled between the first coupler and the second coupler;
a light source configured to send a light through the first and second fiber optic cable;
a photodetector configured to convert received light into electrical signals; and
a computing unit configured to calculate a ratio between an anti-Stokes band in the received light and a Stokes band in the received light to determine a temperature along a length of the first or second fiber optic cable.

9. The system of claim 8, further comprising:
a third fiber optic cable; and
a second coupling system coupled between the second fiber optic cable and the third fiber optic cable; wherein,
the second coupling system comprises:
a third coupler coupled to the second fiber optic cable;
a fourth coupler coupled to the third fiber optic cable; and
a second optical isolator coupled between the first coupler and the second coupler.

10. The system of claim 9, wherein:
a length of the first fiber optic cable is not equal to a length of the second fiber optic cable.

11. The system of claim 10, wherein:
the length of the first fiber optic cable is at least 6 kilometers; and
the length of the second fiber optic cable is at least 15 kilometers.

12. A method for measuring temperature via distributed temperature sensing comprising:
transmitting light through a first fiber optic cable, wherein the first fiber optic cable is coupled to a second fiber optic cable;
detecting backscattered light, wherein the backscattered light comprises an anti-Stokes band and a Stokes band in the first fiber optic cable;
calculating a ratio between an intensity of the anti-Stokes band and an intensity of the Stokes band; and
using the calculated ratio to determine a temperature being sensed in the first fiber optic cable or the second fiber optic cable; wherein:
the first fiber optic cable is coupled to the second fiber optic cable via a first coupler coupled to the first fiber optic cable, a second coupler coupled to the second fiber optic cable, and an optical isolator coupled between the first coupler and the second coupler; and
wherein the optical isolator is configured to remove a Stokes signal traveling from the first fiber optic cable to the second fiber optic cable.

13. The method of claim 12, wherein the first coupler is a first wavelength division multiplexer.

14. The method of claim 12, wherein the first wavelength division multiplexer is configured to separate a light signal from the first fiber optic cable into a pump signal and the Stokes band.

15. The method of claim 14, wherein the second coupler is a second wavelength division multiplexer.

16. The method of claim 15, wherein the optical isolator is further configured to allow a backscattered signal to travel from the second fiber optic cable to the first fiber optic cable.

* * * * *